（12） United States Patent
Karlsson et al.

(10) Patent No.: US 6,510,564 B1
(45) Date of Patent: Jan. 28, 2003

(54) VACUUM TOILET SYSTEM FOR A VEHICLE

(75) Inventors: Kent Karlsson, Poecking; Karl Kechele, Augsburg; Yavuz M. Dedegil, Karlsruhe, all of (DE)

(73) Assignee: AOA Apparatebau Gauting GmbH, Gauting (DE)

( * ) Notice: Subject to any disclaimer, the term of this patent is extended or adjusted under 35 U.S.C. 154(b) by 0 days.

(21) Appl. No.: 09/786,246
(22) PCT Filed: Aug. 21, 1999
(86) PCT No.: PCT/EP99/06141
  § 371 (c)(1),
  (2), (4) Date: Feb. 28, 2001
(87) PCT Pub. No.: WO00/12383
  PCT Pub. Date: Mar. 9, 2000

(30) Foreign Application Priority Data

Aug. 29, 1998 (DE) ..................... 298 15 554 U

(51) Int. Cl.[7] .............................. E03D 11/00
(52) U.S. Cl. ........................................... 4/431
(58) Field of Search .................. 4/321–323, 431–433

(56) References Cited

U.S. PATENT DOCUMENTS 4,184,506 A * 1/1980 Varis et al. .................... 4/431
4,791,688 A * 12/1988 Krishnakumar et al. ....... 4/321
4,871,452 A   10/1989 Kohler et al.
5,245,711 A    9/1993 Oldfelt et al.
5,326,069 A    7/1994 Clear et al.

FOREIGN PATENT DOCUMENTS

DE   42 23 803   1/1993
GB   1 288 781   9/1972

* cited by examiner

Primary Examiner—Charles R. Eloshway
(74) Attorney, Agent, or Firm—Katten Muchin Zavis Rosenman

(57) ABSTRACT

A vacuum toilet system comprises a plurality of toilets, a collecting tank, a conduit system that connects the plurality of toilets with the collecting tank, and a vacuum generator that is connected in a fluidic manner to the collecting tank. The conduit system further comprises a main duct and a plurality of branch ducts, via which the plurality of toilets are connected to said main duct and which discharge into the main duct at an acute angle formed with a component that is pointed in a delivery direction in the main duct, wherein the branch ducts describe curved sections adjacent to a respective inflow thereof having a curvature mid-point of a respective mid-line of the curved sections of the branch ducts being located behind a respective inflow point of a center line in the main duct with regard to the delivery direction in said main duct.

6 Claims, 1 Drawing Sheet

VACUUM TOILET SYSTEM FOR A VEHICLE

FIELD OF THE INVENTION

Figure 1:
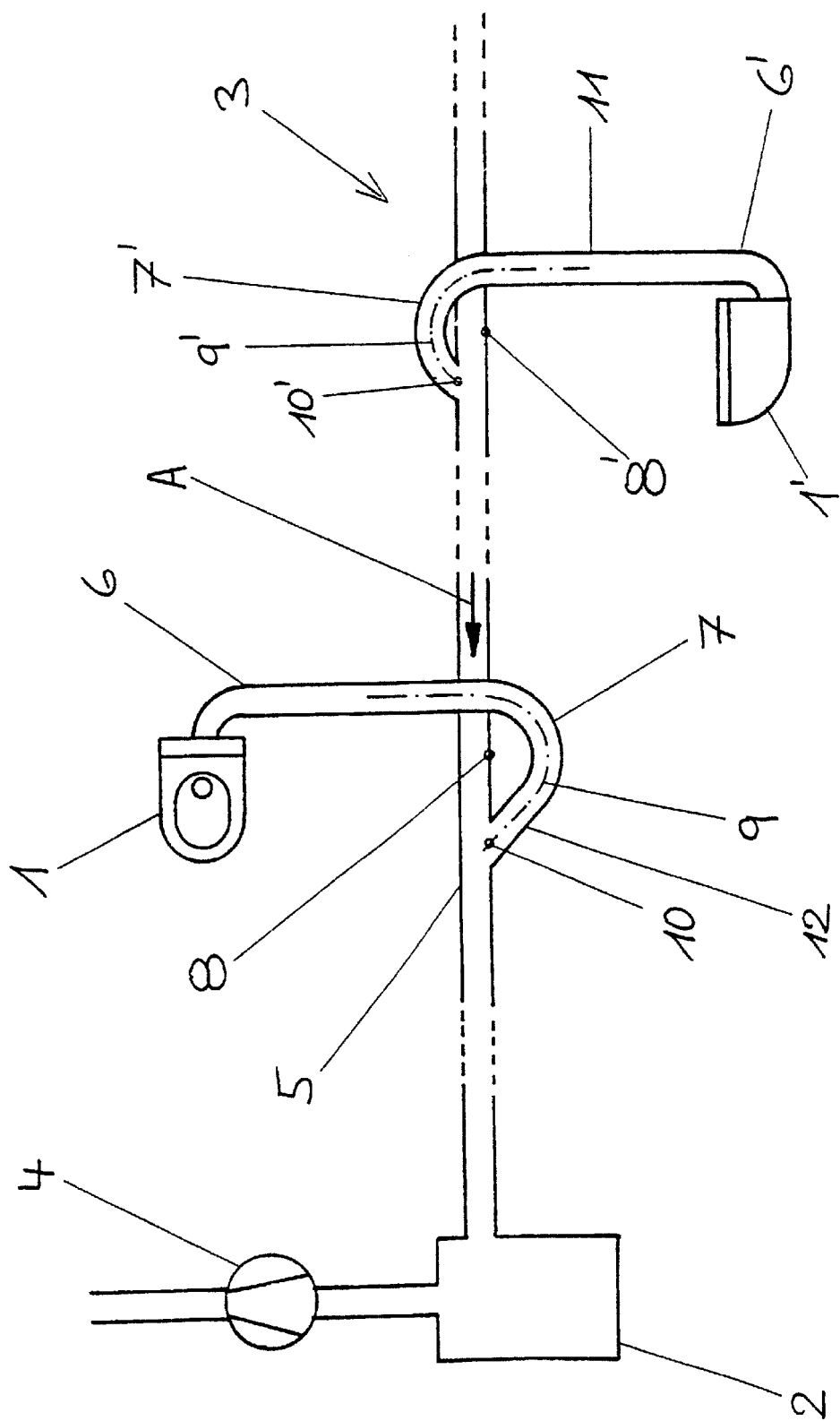

The present invention concerns a vacuum toilet system for a vehicle, especially for a passenger aircraft, comprising a plurality of toilets, a collecting tank, a water conduit system connected with the collecting tank and vacuum generator connected in a fluidic manner with the collecting tank. The conduit system comprises at least one main duct and a plurality of branch ducts, via which the toilets are connected to at least one main duct. The branch ducts discharge into the main duct at an acute angle formed with a component that is pointed in a delivery direction in the main duct. In addition, the branch ducts describe a curve adjacent to the respective inflow thereof.

BACKGROUND OF THE INVENTION

A vacuum toilet system of this type is disclosed in U.S. Pat. No. 4,871,452 (corresponding to EP-A-0298199). Comparable vacuum toilet systems, in which, however, the branch ducts discharge into the main duct at a right angle, and feed directly into the main duct adjacent to their inflow, are additionally described in U.S. Pat. No. 5,245,711 (corresponding to EP-A-036012 and EP-A-0530859) and German patent publication DE-A-4123803. All of the vacuum toilet systems mentioned work in conformity and in such a way that, in the course of a flush program carried out after use, a predetermined amount of flush water is first of all let into the toilet and the flush valve is subsequently opened for a short period (approx. 4 seconds). If the vacuum toilet system is installed in an aircraft and this is flying at a sufficient altitude, the vacuum in the collecting tank and the conduit system will be provided by the pressure difference between the cabin and the ambient; at lower flight altitudes and on the ground the vacuum in the collecting tank and in the conduit system is generated by the vacuum generator being switched on at the beginning of the flush program. This applies in any case for vacuum toilet systems installed in road vehicles and water craft.

All of the vacuum toilet systems mentioned have the disadvantage that, in at least one main duct upstream from the inflow, deposits are formed in the branch ducts, which impair the flow conditions and whose removal entails considerable costs for care and maintenance.

It is therefore an object of the present invention to develop a vacuum toilet system of the type indicated above which involves much smaller maintenance cost to maintain the best possible flow conditions.

SUMMARY OF THE INVENTION

In accordance with the invention, this object is provided by locating the curvature mid-point of the respective center line of the curved sections of the branch ducts behind the respective inflow point of the center line in the main duct with regard to the delivery direction in said main duct. In the case of this geometry of the branch ducts adjacent to their respective inflows into the main duct concerned, the conclusion can be drawn of a clear reduction in the formation of deposits in the sections of the main duct located upstream of the inflows of the branch ducts into the main duct. This constitutes an absolutely surprising finding; for, in application of the generally recognized rules of fluid mechanics, vacuum toilet systems constructed in accordance with the invention would by themselves be expected to produce more unfavorable flow relationships than in the case of the nearest art represented by U.S. Pat. No. 4,871,452. An explanation for the findings which emerge in application of the present invention is successful, however, if the three characteristic features for vacuum toilet systems evaluated below are taken into account: the material to be conveyed is a non-Newtonian fluid; rather, in its greater adherence to the interior walls of the duct, the material to be conveyed displays certain features that are more characteristic of Bingham fluids. Furthermore, the flow conditions are to a large degree unsteady. And, finally, the vacuum generated in the collecting tank and in the conduit system is also present in the section of the main duct that is located upstream from the inflow viewed in the particular case. Based on these premises, which can be made in respect of no other fluid delivery system, the problem emerging in the case of vacuum toilet systems of this type can best be accounted for by the fact that material to be conveyed of this type enters into the main duct on the basis of its Bingham characteristics and under the influence of centrifugal forces at the back of the inflow outlet—in relation to the delivery direction in the main duct—of the branch duct into the main duct, where the vacuum existing in the upstream section and the unsteady flow conditions both generate a back-flow, which partially entrains the material to be conveyed in the area of the main duct which is located upstream. It is at this point that the said material clings to the interior wall of the main duct and is withdrawn from the remaining flushing procedure. This then relatively quickly leads to the formation of deposits due to particles of the material to be conveyed clinging to the interior wall of the main duct into the branch duct that is located upstream. The effect on the vacuum toilet systems designed in accordance with the invention, may be explained by the fact that in such a case the centrifugal forces acting in the curvature sections that are located adjacent to the inflows of the branch ducts carry the material to be conveyed to the area of the inflow outlet that is located downstream from the branch duct concerned into the main duct, where a back flow is not so pronounced.

Although the material to be conveyed in vacuum toilet systems in accordance with the invention is thus exposed to a clearly smaller back-flow in the main duct, it is to a large extent intercepted by the flush procedure and conveyed to the collecting tank. In this way, the formation of deposits due to material to be conveyed clinging to the interior wall is significantly reduced.

Another important further development of the invention is that the curved section of the branch duct has a degree of curvature that is at least 90°. At the same time, it is especially advantageous that the branch duct is curved at a degree of curvature of between 90° and 165°. In conclusion, this means that the branch ducts, coming from the toilets, are expediently carried past the main duct, and particularly conveniently above the main duct, in order to prevent accumulations of the conveyed material from flowing into the branch duct from the main duct, in order to subsequently flow into the main duct from the opposite side in accordance with the curved section provided in the invention. In practice, this means that a branch duct, which connects a vacuum toilet located to the right of the main duct—in relation to the direction of the current in the main duct—discharges into the main duct from the left. The same applies for vacuum toilet systems located to the left of, via or under the main duct, while the corresponding branch duct here discharges into the main duct from the right, from beneath or from above. This too is a completely surprising finding, particularly against the background of the recognized rules of fluid mechanics, which provides for as short a possible arrangement of the ducts in order to avoid further losses.

A further beneficial development of the invention is that the toilets are arranged at a lower level than the main duct, in which the branch ducts comprise an ascending duct section. The advantages achievable by the invention are especially prominent in the so-called flush-mounted toilets with (relatively long) ascending ducts provided here. In addition, the inflow of the branch duct into the main duct, which is in this case provided from above (see above) results in the situation where residual matter which is left behind in the main duct cannot flow back into the branch ducts. However, the invention is in no way restricted to vacuum toilet systems comprising flush-mounted toilets of this type; rather, advantages stated above can be seen in the case of traditional arrangements of toilets on or above the level of the main duct.

For the sake of clarification, it should be noted at this point that the specification according to which the branch duct describes a curve adjacent to the respective inflow thereof into the main duct is not to be understood as signifying that every branch duct directly adjacent to its inflow into the main duct concerned is curved. Rather, the branch ducts can also show a straight section between the curved sections and their respective inflows provided in accordance with the invention Even an insignificant counter-curve to the curve provided in accordance with the invention has no detrimental effect, since in this way the accumulation of the conveyed material created by the centrifugal forces in the actual curve undergoes no significant alteration.

In other respects, it should be made clear at this point that the curve of the branch duct which is significant for the present invention in no sense has to comprise an exact arc with a single center of curvature. Rather, the curvature of the branch duct can change significantly along its the full length of its course. In such a case, there is a plurality of centers of curvature. It is important here that at least some of the centers of curvature are located behind the respective point of inflow, in relation to the direction of the conveyance in the main duct concerned, of the mid-line into the main duct.

DETAILED DESCRIPTION OF THE INVENTION

In the following, the invention will be described in greater detail with reference to the drawing. FIG. 1 is a diagrammatic representation of a preferred embodiment of a vacuum toilet system in accordance with the invention, in which only two of the toilets are represented. In this a floor-mounted toilet is illustrated in horizontal projection and a flush-mounted toilet 1' in lateral projection.

The vacuum toilet system comprises in a manner known per se a plurality of toilets 1, 1', a collecting tank 2, a conduit system 3 connecting the toilets with the collecting tank 2 and a vacuum generator 4 connected in a fluidic manner with the collecting tank. The conduit system 3 comprises a main duct 5 and branch ducts 6, 6', via which the toilets 1, 1' are connected to the main duct 5. To this extent, the represented vacuum system corresponds to that of the prior art, with the exception of the previously unusual flush-mounted design of the toilet 1, whereby a more detailed explanation will be dispensed with. Equally dispensed with is the representation of generally known features of vacuum toilet systems such as, for example, a flush water device and flush valves arranged at the exit of the toilets. These details are not significant within the framework of the invention.

The shape of the branch ducts 6, 6' is significant in each case. These ducts comprise respectively a curve 7 or 7' having a curvature such that the center of curvature 8 or 8' of the respective mid-point 9 or 9' of the curved sections 7 or 7' of the branch ducts 6 or 6' is, in relation to the direction being behind conveyed A in the main duct 5, located behind the respective inflow point 10 or 10, of the mid-line 9 or 9' into the main duct. In conclusion therefore, the branch duct 6 or 6' crosses the main duct and discharges into the main duct 5 on a side opposite the side facing the respective toilets 1.

In addition, FIG. 1 diagrammatically illustrates that the toilets can be built as underfloor, flush-mounted toilets 1', while the branch duct 6' is constructed as ascending duct 11, which connects the toilet 1 located under the level of the main duct with the main duct. The horizontal projection onto the toilet 1 in the floor-mounted arrangement provides further indication that the branch duct 6 has passed above the main duct 5, leading to the reduction of the back-flow effect, and that the branch duct 6 between the curve 7 and the inflow into the main duct 5 can perfectly well comprise a straight cross section 12.

What is claimed is:

1. Vacuum toilet system for a vehicle comprising:
   a plurality of toilets,
   a collecting tank,
   a conduit system, which connects the plurality of toilets with the collecting tank and a vacuum generator, which is connected in a fluidic manner to the collecting tank,
   wherein the conduit system comprises at least a main duct and a plurality of branch ducts, via which the plurality of toilets are connected to said at least one main duct and which discharge into the main duct at an acute angle formed with a component that is pointed in a delivery direction in the main duct,
   wherein the branch ducts describe curved sections adjacent to a respective inflow thereof having a curvature mid-point of a respective mid-line of the curved sections of the branch ducts being located behind a respective inflow point of a center line in the main duct with regard to the delivery direction in said main duct.

2. Vacuum toilet system under claim 1, wherein the degree of curvature of the curved sections of the branch ducts is at least 90°.

3. Vacuum toilet system under claim 1, wherein the degree of curvature of the curved sections of the branch ducts measures between about 90° and 165°.

4. Vacuum system under claim 1, wherein at least one of the toilets of said plurality being arranged as underfloor-mounted toilets on a level below the main duct, wherein the respective branch duct comprises an ascending duct section.

5. Vacuum toilet system under claim 4, wherein at least some of the toilets of said plurality are configured as floor-mounted toilets and wherein the branch ducts cross the main duct.

6. Vacuum toilet system under claim 1, wherein the branch ducts cross the main duct and discharge into the main duct on a first side opposite a second side facing the respective toilet.

* * * * *